Oct. 5, 1965           J. W. TOMA           3,209,381

PROCESS OF CENTRIFUGALLY EXTRACTING LIQUID FROM CLOTHES

Original Filed Oct. 1, 1959           4 Sheets-Sheet 1

INVENTOR.
JOHN W. TOMA

BY *Derek P Lawrence*

HIS ATTORNEY

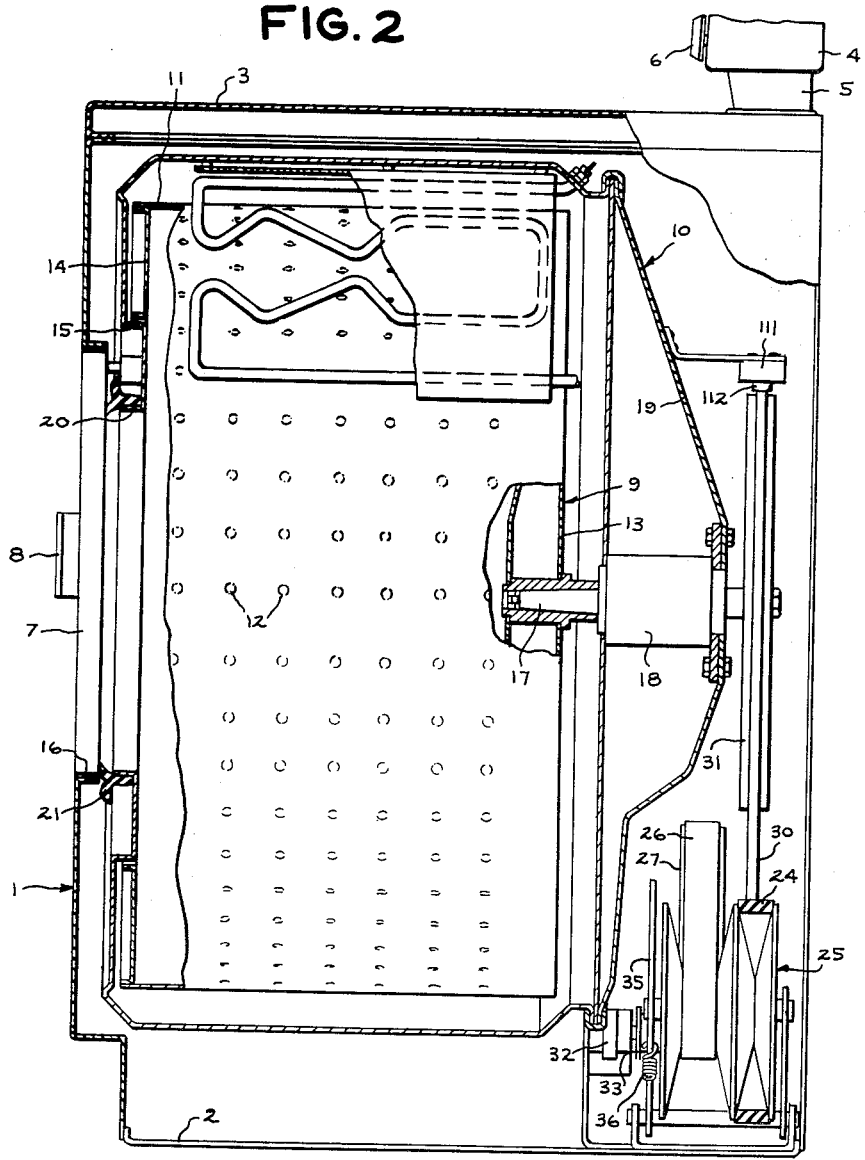

Oct. 5, 1965 J. W. TOMA 3,209,381
PROCESS OF CENTRIFUGALLY EXTRACTING LIQUID FROM CLOTHES
Original Filed Oct. 1, 1959 4 Sheets-Sheet 4

INVENTOR.
JOHN W. TOMA
BY
HIS ATTORNEY

United States Patent Office 3,209,381
Patented Oct. 5, 1965

3,209,381
PROCESS FOR CENTRIFUGALLY EXTRACTING
LIQUID FROM CLOTHES
John W. Toma, Louisville, Ky., assignor to General
Electric Company, a corporation of New York
Original application Oct. 1, 1959, Ser. No. 843,755, now
Patent No. 3,055,203, dated Sept. 25, 1962. Divided
and this application May 2, 1962, Ser. No. 191,952
3 Claims. (Cl. 8—159)

This application is a division of my earlier filed application, Ser. No. 843,755 filed Oct. 7, 1959 (now Patent 3,055,203 issued Sept. 25, 1962) and assigned to the same assignee as the present invention. The invention of this application relates to a process for centrifugally extracting liquid from clothes, and more particularly to such a process which is especially suited for use in automatic combination washer-dryers which first wash clothes, then centrifugally extract liquid therefrom, and then dry the clothes by a heat drying operation.

Combination washer-dryers are machines which provide for complete laundering of textile materials, that is, they provide a washing operation which includes washing and rinsing, a centrifugal extraction operation or spin operation for removing a substantial part of the water from the clothes after the wash operation, and then a complete drying of the material, generally effected by tumbling the clothes in the presence of warm air. It has been found that, at the high speeds desirable for maximum liquid removal, forcing liquid radially outwardly through the materials during the centrifugal extraction operation has the effect of matting down the fibers of the materials and causing them to adhere to the inner surface of the clothes container so firmly that even after the container ceases to rotate at centrifuging speed they remain in that position. Inasmuch as the heat drying of the materials is dependent upon their being tumbled so as to continually present different surfaces to the circulating air, it will readily be seen that, if the materials adhere to the periphery of the container after the centrifugal operation, the necessary tumbling will not occur and drying will not be effected.

Two major factors have been found to have bearing on the phenomenon of adherence of the materials to the inner container surface, in addition to the previously mentioned factor of speed. First, it has been observed that the greater the amount of liquid forced through the materials or the clothes, the greater the tendency of the clothes to adhere to the container wall. It follows, then, that the less liquid contained in the clothes the higher the speed at which the container or basket can be rotated without the undesired adherence occurring. The second important factor is time: while high speeds and highly wet clothes will produce adherence, there is a time factor involved. In other words, if the high speed is provided only for a brief period, on the order of an impulse of a few seconds or a few tenths of a second, a substantial amount of water is removed from the clothes during that period before the phenomenon of adherence occurs. Thus, if the speed of rotation is decreased enough for the clothes to be redistributed prior to the minimum time for adherence to occur, the clothes will be dryer than before and "sticking," that is, the adherence phenomenon, will not have occurred. I have found that by providing one or more such brief intervals of spin, or impulses, and allowing redistribution of the clothes after each one I can remove a substantial amount of liquid from the clothes without sticking having occurred, even though the speed of rotation attained during the impulse was one at which the sticking phenomenon does occur when the rotation is continued for more than a few seconds.

Once a substantial amount of water has been removed from the clothes by these impulses, the water content of the clothes then becomes low enough so that the spin speed may be provided for the usual period of several minutes and sticking will not occur because the amount of water being forced through the clothes is not sufficient to cause adherence. Thus, adherence may be avoided at first by limiting the time during which the spin operation is provided before redistributing the clothes and then, after enough water has been removed in this manner, the normal spin operation to remove the usual amount of liquid by prolonged high speed centrifuging may be provided.

Based on the foregoing findings, it is therefore an object of my invention to provide an improved centrifuging process wherein the centrifugal liquid extraction operation is conducted at a speed which would normally cause sticking of the clothes, yet in which the sticking does not occur and therefore the clothes fall freely away from the container at the end of the centrifuging operation.

A more specific object of my invention is to achieve this goal by providing a process in which the spin operation includes high speed spin impulses for periods of time which are below the minimum time required for clothes adherence to the container until the amount of liquid in the clothes has been decreased to the point where the high speed spin may be provided for the longer usual period without sticking occurring.

In accordance with my invention, I provide a primary extraction of most of the retained liquid from clothes contained within a basket rotatable on a nonvertical axis by rotating the basket at a centrifuging speed which is above the minimum speed but is for less than the minimum period required for clothes adherence. Then the speed is reduced sufficiently to permit the clothes to fall away from the walls of the basket by gravity. Then, after this, a final extraction of the liquid may be provided by increasing the speed of the basket again to a centrifuging speed which again is above the stated minimum speed but this time is provided for a period substantially in excess of the minimum. Nonetheless, there will be no adherence of the clothes to the basket because of the fact that the major portion of liquid has already been removed from the clothes.

Preferably, I provide the primary and the final extractions at the same speed; also, preferably, a series of two or more such primary extractions are provided so as to remove as much liquid as possible before the regular final extraction is provided. Of course, where several primary extractions are provided, each one is separated from the subsequent primary extraction by a reduction in speed sufficient to permit the clothes to fall away from the wall of the basket by gravity. A further point is that the reduction in speed may readily be provided by complete stopping of the basket rotation, as well as by tumbling-speed basket rotation.

The subject matter which I regard as my invention is particularly pointed out and distinctly claimed in the concluding portion of this specification. My invention itself, however, may best be understood by reference to the following description taken in conjunction with the accompanying drawings.

In the drawings, FIGURE 1 is a rear elevational view of a combination washer-dryer which incorporates a structure for effecting my improved process, with the rear panel removed to illustrate details;

FIGURE 2 is a side elevational view of the machine of FIGURE 1, partly in section with certain surfaces broken away to show details;

FIGURE 3 is a schematic diagram illustrating the basic steps required in the provision of my improved process;

Figure 1:
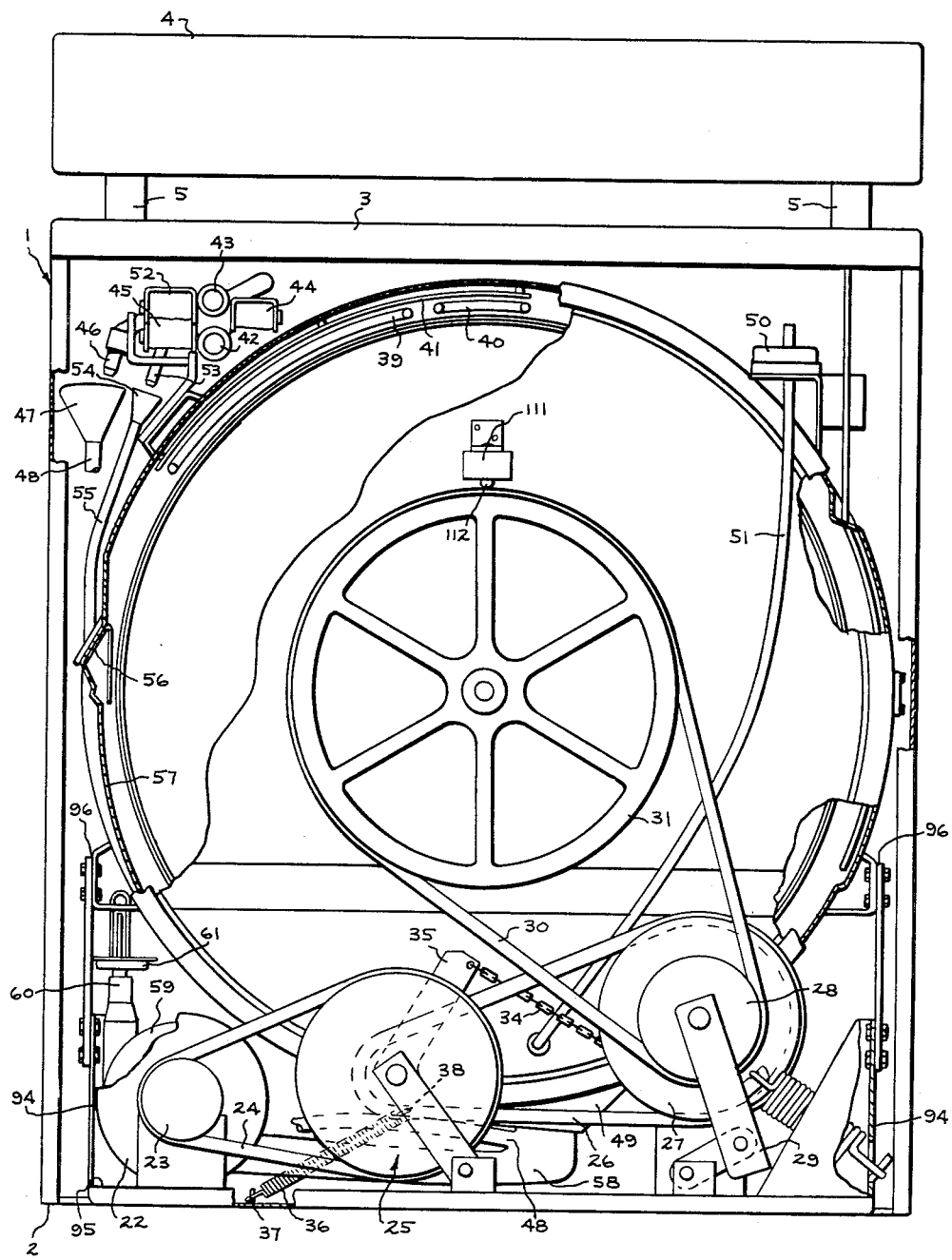

Referring now to FIGURES 1 and 2 of the drawings, there is shown a combination clothes washing and drying machine wherein the operating elements of the machine are included within an outer cabinet structure having a central wrap-around section 1. Section 1 is supported on a base and toe board assembly 2 and carries a separate top 3 on which is supported a backsplasher and control panel 4 which may, as shown, be mounted on posts 5. Control panel 4 is provided with appropriate manual controls, generally shown at 6, which may control various types of washing and drying sequences and various other functions such as water temperature, omission of dryer function, etc. Access to the interior of the machine is provided by a door 7 formed in section 1, the door being mounted on concealed hinges and being opened by suitable means such as latch control 8.

As best shown in FIGURE 2, the machine is preferably of the non-vertical axis type, in this particular case the axis being horizontal. In other words, the machine has a clothes basket or container 9 mounted for rotation on a generally horizontal axis with an outer enclosing tub structure 10. Basket 9 comprises a cylindrical outer wall 11 provided with a plurality of suitably spaced perforations 12 to allow air and water communication between the interior and the exterior of basket 9. The rear of the basket is closed by means of a suitable wall or plate 13. The basket also includes a front wall 14 which is formed so as to define an access or loading opening 15 in registry with an opening 16 in wrap-around section 1 provided for door 7. The container is rotatably supported by a shaft 17 which is mounted in an elongated bearing 18 supported from rear wall 19 of tub 10. The tub is also provided with an opening 20 aligned with openings 15 and 16 so that clothes may be placed into and removed from the basket when door 7 is opened. The door seals against a suitable gasket 21 during operation of the machine.

During the operation of the machine the basket 9 is driven from an electric motor 22. The drive from the motor to the basket includes a pulley 23 which is secured to the motor shaft so as to rotate therewith and over which passes a belt 24 driving an adjustable sheave assembly 25. From the adjustable sheave assembly 25 a belt 26 drives a pulley 27 which is secured to rotate with a pulley 28 mounted on a linkage 29 secured to the base 2 of the machine. A belt 30 connects pulley 28 to a pulley 31 secured on the end of shaft 17 so that rotation of pulley 31 causes rotation of the shaft and consequently of the basket 9. The drive arrangement provides, for a single speed of motor 22, different speeds of rotation of the basket as controlled by the adjustable sheave assembly 25. The arrangement of the adjustable sheave assembly 25 is in turn controlled by a small electric gear motor assembly 32 (FIGURE 2) which drives a pulley 33 connected by a chain 34 to an arm 35 secured in controlling relation to the sheave assembly 25. The precise manner in which the adjustable sheave assembly controls the speed is conventional, and is fully described and illustrated in, for instance, application Serial No. 781,778 filed on Dec. 19, 1958 (now Patent 2,970,464 issued Feb. 7, 1961) and assigned to the General Electric Company, assignee of the present invention. When the gear motor is not operating, a spring 36, secured at one end 37 to the base 2 of the machine and at its other end 38 to the adjustable sheave assembly, pulls assembly 25 to the left (FIGURE 1) to a relatively low speed such as, for instance, 47 r.p.m. to be provided for tumbling the clothes in the basket both during a washing operation and a drying operation and for achieving an appropriate circulation of air during the heat drying operation. Similarly, when operation of the gear motor causes chain 34 to be wound up on pulley 33, assembly 25 is pulled over to the right to transmit a relatively high speed on the order of 300 r.p.m. or more for centrifugally extracting liquid from the clothes; this is commonly done after the washing operation and prior to the heat drying operation. In accordance with the illustrated structure, the rotation of motor 22 is such as to provide a clockwise rotation of basket 9 as viewed in FIGURE 1.

To heat the clothes during the drying portion of the cycle, there is provided in the machine a heater assembly including two electric heaters 39 and 40. The heaters are adjacent the outer surface of wall 11 of the basket so that during low speed rotation of the basket the wall is heated, the air adjacent the heaters is heated, and heat is provided directly to the clothes by radiation through perforations 12. Behind the heaters a suitable reflector plate 41 may be provided so as to assist in the heating of the clothes by reflecting heat from behind the heaters back into and against the drum.

The illustrated machine also includes suitable water supply means having connections 42 and 43 through which hot and cold water is supplied to the machine for the washing operation. A valve controlled by a solenoid 44 admits hot water to the machine, and a valve controlled by an opposed solenoid 45 admits cold water to the machine. Hot and cold water valves under the control of solenoids 44 and 45 discharge through a common outlet conduit 46, through a suitable air gap, and into a funnel 47 which leads through a conduit 48 to a sump 49 formed at the bottom of tub 10. The air gap provided by the funnel 47 makes it impossible for water to be syphoned from the machine and thus contaminate the incoming water supply line. A pressure actuated sensing device, or water level control, 50, controls both solenoids 44 and 45 to maintain the proper water level in the machine during the washing operation. Sensing device 50 is connected to the interior of tub 10 by a conduit 51.

The illustrated machine is of the type which provides cold water during the drying cycle for condensing from the circulating air the moisture extracted from the clothes, the air circulating near the heaters, then over the clothes, and then adjacent the moisture condensing means. The condensing water is admitted to the machine through an additional solenoid actuated valve 52 which is energized during the drying operation so that the valve passes water at a slow rate sufficient to condense from the air the moisture vaporized from the clothes. As shown, the condenser water discharges into a conduit 53 and then passes through an appropriate air gap to a funnel 54 and a conduit 55 which connects with an opening 56 in the side of tub 10. From opening 56 the condenser water passes into the tub 10 and then flows in a thin sheet down the lower left wall 57 so as to cool a substantial portion of the area of the side wall and provide a large cool surface for condensing the moisture extracted from the clothes.

The wash and rinse water used during the washing portion of the operation and the condenser water and the moisture extracted from the clothes during the drying operation are discharged from the machine through the sump 49 mounted at the bottom of the tub. A suitable discharge hose 58 leads from the sump to a motor driven drain pump 59 which discharges through an outlet 60 to a valve 61 controlled by a suitable solenoid (schematically shown at 62 in FIGURE 4). Since pump 59 is continually operated, the draining of water from sump 49 is controlled by the drain valve, draining occurring upon energization of solenoid 62.

With the apparatus described, any suitable sequence derived from the basic sequence of washing, rinsing, draining and spinning may be utilized to effect the washing operation of the cycle; this is followed by a suitable centrifugal liquid extraction operation or spin so that at the end of the washing operation a substantial part of the liquid in the clothes is removed therefrom. This in turn may be followed, where so desired by the operator, by suitable heating of the clothes as they are tumbled in basket 9.

Figure 4:
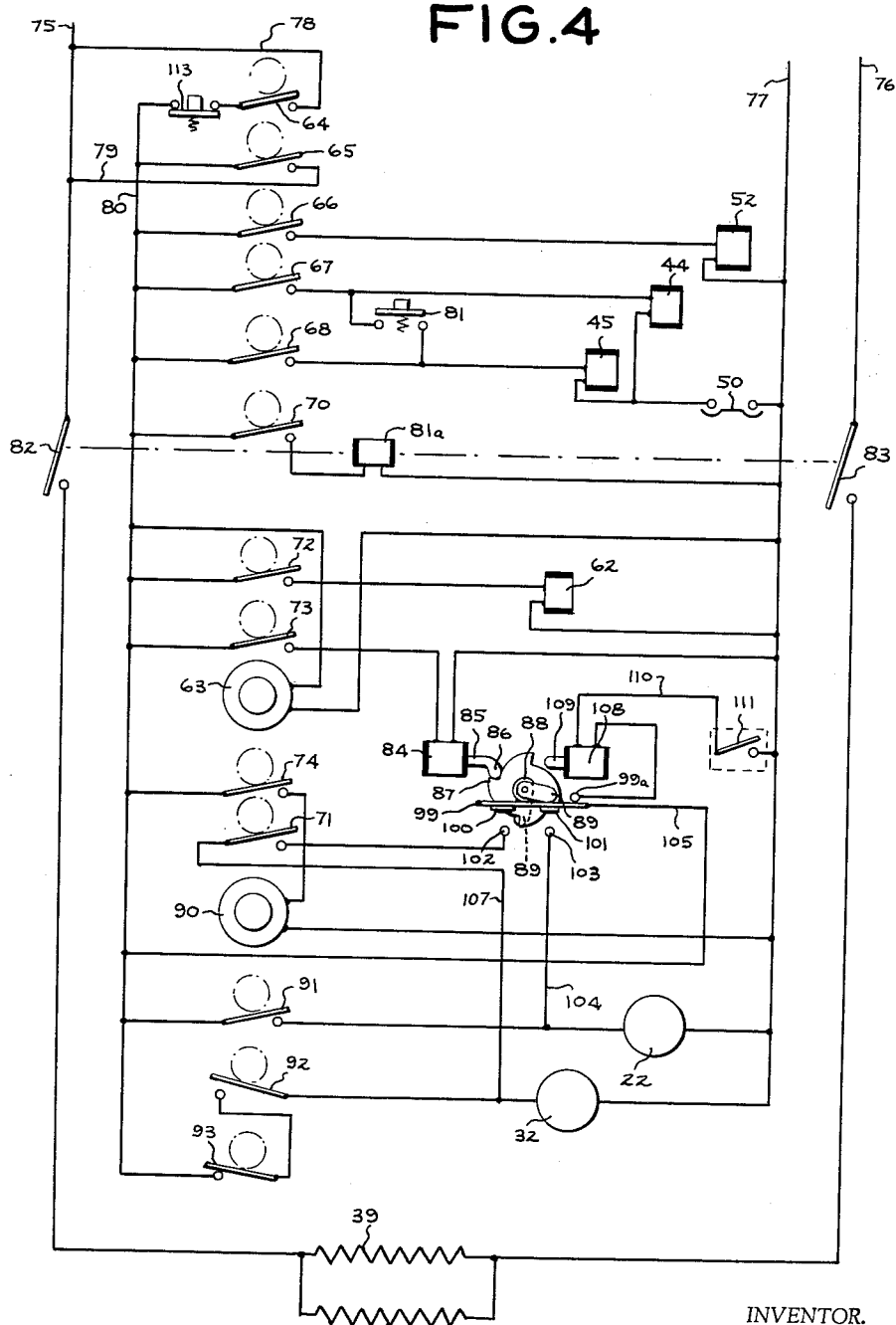
FIGURE 4 is a schematic diagram of a control circuit appropriate for use in causing the machine of FIGURES 1 and 2 to effect my improved process.
Figure 5:
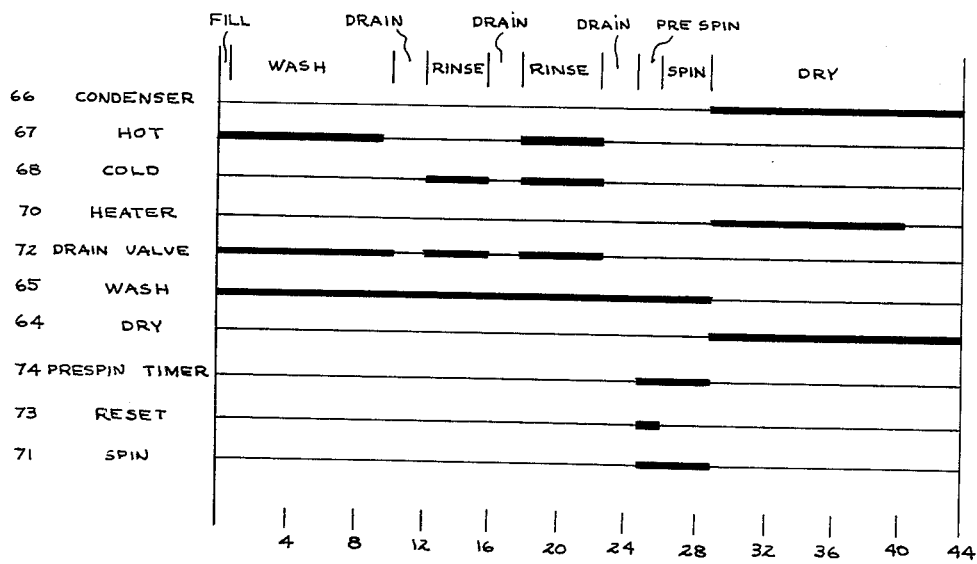
FIGURE 5 is a cam chart representing a development of the surface of the top ten cams shown in FIGURE 4.

Referring now to FIGURE 4, in order to provide automatically a proper sequence of operations including my improved liquid extraction process, there is provided a sequence control in which a primary timer motor 63 controls a plurality of timer switches 64, 65, 66, 67, 68, 70, 71, 72, 73, and 74. Switches 64–68 and 70–74 are actuated in a desired sequence by appropriate switch operating means driven by the timer as indicated schematically in FIGURE 5. Sequence controls are well known, and several types are commercially available; the representation of FIGURES 4 and 5 is therefore schematic, it being understood that each of the switches 64–68 and 70–74 is operated by conventional means such as cams. Each of the switches 64–68 and 70–74 of FIGURE 4 is closed during the periods indicated by the heavy black lines in FIGURE 5. In other words, the chart of FIGURE 5 may be regarded for the purposes of this application to be a development of the peripheries of the respective switch operating cams, the heavy lines showing the cam rises.

The power connections for the machine include a pair of line conductors 75 and 76 having a potential of 230 volts between them, and a neutral conductor 77 which has a potential difference of 115 volts with each of the conductors 75 and 76. Switches 64 and 65 are respectively connected by conductors 78 and 79 between conductor 75 on the one hand and a conductor 80 on the other hand. Switch 66 controls the condenser valve solenoid 52, being in series with it between the conductor 80 and neutral 77 and thus across 115 volts. Switch 67 is in series with hot water valve 44 betwen conductors 77 and 80, and switch 68 is in series with cold water valve solenoid 45 between conductors 77 and 80. Both the hot and cold water solenoids are also in series with the water level control switch 50, and a manually operable switch 81 is provided to permit both solenoids 44 and 45 to be energized when switch 67 is closed so as to provide warm water rather than hot water for washing purposes.

Switch 72 is in series with the drain valve controlling solenoid 62 between conductors 77 and 80; inasmuch as the main drive motor 22 operates continuously during the washing and heat drying operations (as will be further explained below), the closing of switch 72, by its energization of solenoid 62, determines when the pump driven by the motor will be operative or inoperative.

A relay device 81a is provided which controls a pair of switches 82 and 83 respectively positioned in lines 75 and 76. In the same manner as the other components, relay 81a is controlled by being in series with timer operated switch 70 between conductors 80 and 77. When the relay is energized it causes switches 82 and 83 to close. When these two switches are closed a 230 volt energizing circuit for the heaters 39 and 40 is completed across conductors 75 and 76.

In addition to the above-mentioned switches, timer motor 63 also controls a switch 73 which is in series with a solenoid member 84 so as to control the energization thereof. Extending from solenoid 84 is a plunger member 85 whose end 86 engages a ratchet wheel 87 provided with a spring 88 biasing it to rotate clockwise to the position shown, in which a cam member 89 carried by wheel 87 points to the right (as viewed in FIGURE 4). It will readily be seen that when solenoid member 85 is in its extended position it prevents the spring 88 from rotating the ratchet 87. In addition the plunger 85 is spring-biased to the position shown so that when the ratchet is rotated counterclockwise (in a manner to be described) the plunger will yield before the rises on the ratchet member and will then spring outwardly to retain the ratchet member in whatever position it has been moved to in the counterclockwise direction.

The last switch 74 controlled by timer motor 63 is in series with an auxiliary timer motor 90 between conductors 77 and 80. Timer motor 90 controls three switches 91, 92 and 93.

Switch 91 controls the operation of the main motor 22, provided a switch member 99 has not caused engagement of contacts 100 and 101 with stationary contacts 102 and 103 respectively. Thus, when switch member 99 is open switch 91 controls the operation of motor 22. When switch 99 is closed, the motor is operated independently of switch 91 through a circuit which, starting at neutral conductor 77, proceeds through the motor, a conductor 104, contacts 103 and 101, and conductor 105 to conductor 80.

Both switches 92 and 93 are in series with the gear motor so that in order for the gear motor to be energized between conductors 80 and 77 when switch 99 is opened, both switches 92 and 93 must be closed. When switch 99 is closed, a circuit for the gear motor assembly 32 may then be completed independently of switches 92 and 93, starting at conductor 80 and extending through conductor 105, contacts 100 and 102, switch 71, conductor 107, and the gear motor asembly itself to conductor 77.

In order to cause movement of ratchet wheel 87, there is provided a solenoid member having a plunger 109 intended to engage the ratchet 87 and move it a quarter revolution upon each energization of the solenoid 108. The solenoid is energized between conductors 80 and 77 through conductor 105, switch 99, a contact 99a, the solenoid itself, and a conductor 110 which includes a centrifugal switch 111 responsive to basket speed. Switch 99 engages contact 99a when contacts 100 and 101 are separated from contacts 102 and 103, and separates from contact 99a when the other contacts are closed. Switch 111 may be provided at any appropriate part of the machine, for instance, as shown in FIGURE 1, it may be secured to the back wall of tub 10 with a portion 112 in engagement with belt 30 so as to sense rotation of that belt as caused by the motor 22.

It will readily be seen, by reference to FIGURES 4 and 5 that the timer motor 63, by operating switches 64, 65, 66, 67, 68, 70, 71, 72, 73 and 74 in the sequence shown in FIGURE 5 causes an appropriate sequence of operations, or process, to be performed for either a washing cycle or a complete washing and drying cycle. Thus, typically, at the beginning of an operation switches 65, 67, and 72, are closed. Upon the closing of switch 65 conductor 80 is connected to conductor 75. Because ratchet wheel 87 is in the position shown with the cam member 89 in dotted outline to close the contacts 100, 101, 102 and 103 of switch 99, motor 22 is energized through the circuit which avoids any control from switch 91. In other words, main motor 22 is energized continuously, and with the gear motor assembly 32 not energized (because switches 71, 92 and 93 are all opened) motor 22 will rotate the basket 9 at low speed in order to effect tumbling of the clothes. With switch 67 closed, solenoid 44 opens its valve to permit hot water to enter the drum until pressure sensitive switch 50 opens; in the event that a warm wash has been selected by depression of button 81, cold water also enters so as to form, together with the hot water, warm to be provided for the washing operation. At the end of the wash step, solenoid 62 controlling the drain valve is de-energized by the opening of switch 72. When the solenoid was energized the drain valve was, as described above, closed to permit the machine to retain water for washing purposes. When the solenoid 62 is de-energized the drain valve then opens thus permitting the continually operating pump to pass the water out of the machine to the drain. After an appropriate drain period is timed by motor 63, solenoid 62 is energized to close the drain and cold water solenoid 45 is energized by the closing of switch 68 to cause cold water to be provided for a rinsing step. After another drain, both the hot and cold water solenoids are energized for a warm water rinse, and then this water is also drained out. This terminates the washing otperation, with the clothes at the end of the third drain being clean but completely wet.

At this point, it is the purpose of the machine to spin a substantial amount of water out of the clothes so that the heat drying operation may be limited to as short a period as possible. Timer motor 63 then causes switches 71, 73 and 74 to be closed. The closing of switch 73 is very brief, lasting possibly for only one brief impulse of the timer motor. When switch 73 closes, solenoid 84 is energized to pull back the plunger 85. This permits spring 88 to return ratchet wheel 87 to the position where cam 89 is in the position shown in solid outline, that is, to a position where contacts 100 and 101 are opened and contact 99a is closed. The period during which switch 73 is closed is made just long enough for the ratchet wheel 87 to reset, after which switch 73 is again opened with plunger 85 returning to the position shown so as to be in engagement with ratchet wheel 87 and prevent clockwise movement thereof.

Figure 6:
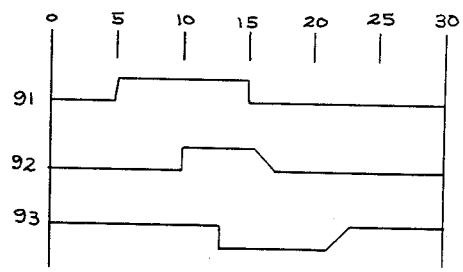
FIGURE 6 is a cam chart representing a development of the surfaces of the bottom three cams shown in FIGURE 4.

With contacts 100, 101, 102 and 103 of switch 99 open, it will readily be seen that the operation of the main motor 22 and of the gear motor assembly 32 becomes dependent on the positions of the switches controlled by auxiliary timing motor 90, these switches all being in open position when the timer motor 90 is not in operation. The closing of switch 74 starts the timer motor 90 in operation. While the main motor 63 is of the usual type for controlling an entire wash and dry cycle lasting many minutes, the auxiliary timer motor 90 is of the type which causes its controlled cams to provide a complete revolution much more quickly, for instance, on the order of 30 seconds as shown in FIGURE 6. Thus, once motor 90 is energized the cams controlling switches 91, 92 and 93 start to rotate. It will be recalled that, at this point, with switch 91 open, motor 22 has ceased to operate so that the clothes are no longer being tumbled. After five seconds of operation of motor 90 switch 91 is closed to energize motor 22 directly between conductors 77 and 80. Since switch 92 is still open, this causes motor 22 to start once again to tumble the clothes. Five seconds later, after ten seconds of operation of motor 90, switch 92 is closed. Since switch 93 was already closed, and since switch 92 is now closed, a complete circuit for energizing gear motor assembly 32 is provided; the gear motor, by moving the sheave assembly 25 of FIGURE 1, starts to accelerate the basket toward its high spin speed of, for instance, 300 r.p.m.

This operation continues for about 3 seconds after which switch 93 opens thereby de-energizing gear motor assembly 32. This three second period of operation of gear motor assembly 32 is just sufficient to bring the basket speed up to the full spin speed of 300 r.p.m. for a very brief period of a fraction of a second, the speed immediately thereafter being decreased back to tumble because of the opening of switch 93. The 300 r.p.m. speed attained during this three second interval of acceleration from tumble speed is one at which sticking of the clothes to the inner surface of the basket will eventually occur. However, it has further been ascertained that, with the amount of water retained in a clothes load prior to any spinning, it takes a finite period of several seconds before the clothes adhere to the inner surface of the basket. For this reason, the operation of the basket at 300 r.p.m. for a period of less than one second, although it removes a substantial amount of water, does not cause sticking of the clothes.

Thus, when switch 93 is opened and the basket is returned to tumble speed, the clothes will fall away from the periphery of the basket and be tumbled as before. As a preferred step, I further insure the falling away of the clothes from the basket by completely stopping motor rotation. This is achieved by opening switch 91 after fifteen seconds of operation of timer 90, thereby to de-energize motor 22 and stop the basket rotation altogether. Switch 92 is subsequently opened, for instance, at about 17 seconds, and switch 93 is subsequently closed, for instance, at about 22 seconds, so that they have their original positions. It will be understood at this point that the provision of two switches 92 and 93 for control of the gear motor assembly 32 is primarily for practical purposes. The exceedingly brief time of operation of gear motor 32, and the fast "make-and-break" action needed being more readily obtained by the useof two separate switches than by the use of a single cam controlled switch.

Thus, at the end of twenty-two seconds it will be seen that switches 91, 92 and 93 are in the same position as at the beginning of the operation of timer motor 90, with a single brief pre-spin operation, or impulse, having been conducted at full spin speed but for a period less than that at which sticking will occur. At this point, it will be recognized that the first two steps of the basic improved process of my invention, as set forth in FIGURE 3, have been provided.

It will generally, although not inevitably, be desirable to repeat steps 1 and 2 of my process more than once, that is, to provide a certain number of these impulses to remove a satisfactory amount of water. For this purpose, the solenoid 108 controlled by centrifugal switch 111 is provided. Switch 111 is so formed that it closes when the basket speed goes up into the spin region; for instance, a range of 100 to 200 r.p.m. for the closing of switch 111 is satisfactory. Each time switch 111 closes, it causes energization of solenoid 108 and upon such energization the plunger 109 of the solenoid moves out into engagement with ratchet wheel 87 to cause the ratchet wheel to rotate counterclockwise one quarter of a revolution. It will be observed at this point that while plunger 85 of solenoid 84 prevents clockwise revolution of the ratchet wheel, it does not prevent counterclockwise rotation; thus, it permits the rotation of the ratchet wheel under the influence of solenoid 108 while preventing the ratchet wheel from returning in a clockwise direction after the solenoid 108 has been de-energized again by a decrease in speed. In this manner, each time that the speed increases over 100–200 r.p.m. the ratchet wheel 87 is caused to rotate one quarter of a revolution, with the cam member 89 being moved around into closing position for switch 99 on the fourth such operation of solenoid 108.

Returning to FIGURE 6, it will be seen that during the twenty second period between the fifteenth second, when switch 91 opens, and the fifth second of the next rotation of the cams by auxiliary timer 90, the basket 9 completely stops and gives the clothes a substantial amount of time for all articles of clothing to pull away from the basket inner surface. At the fifth second, as before, the switch 91 is closed to cause tumbling; at the tenth second the switch 92 is closed to provide a pre-spin impulse; at the thirteenth second the switch 93 is opened to terminate the impulse; and at the fifteenth second the switch 91 opens to stop the motor operation again, with switches 92 and 93 shortly thereafter resetting themselves to their original position. As the spin speed passes above 100–200 r.p.m., solenoid 108 is energized to cause another quarter revolution of ratchet wheel 87.

After the fourth high rise in speed, cam 89 has been moved to the position shown in dotted outline so that it then causes switch 99 to be closed with contact 100 engaging contact 102 and contact 101 engaging contact 103. This completes again the circuit for the main motor which, starting with conductor 77, passes through the main motor, conductor 104, switch 99, and conductor 105 to conductor 80. Thus, the motor 22 starts a continuous tumbling operation independently of the position of switch 91 which, however, may continue to be operated as long as the operation of motor 90 continues. In a similar manner, the energization of gear motor assembly 32, once switch 99 is closed, is effected through a circuit starting at conductor 77, and passing through gear motor assembly 32, conductor 107, closed timer operated switch 71, switch 99, and conductor 105 leading to conductor 80. Thus, with the timer operated switch 71 closed, gear motor assembly 32 is energized continously by the closing of switch 99. It will be seen that this represents the third step in my improved process, that is, a spin provided above the minimum sticking speed and above the minimum sticking period without ever any adherence of the clothes occurring because of the beneficial results of the first two steps. Consequently, after the third impulse, when the basket comes up to spin speed for the fourth time it continues to spin for any desired period, such as, for instance, three minutes as tolled by timer motor 63.

At the point the continued high speed spin of 300 r.p.m. is provided it does not cause sticking. Although it would have caused sticking of the clothes if it had been provided immediately subsequent to the wash operation, it does not cause the clothes to stick to the inner surface of the basket in the machine described because a substantial amount of water has already been removed from the clothes by the pre-spin impulses. In fact, the amount of water so removed is sufficient to prevent the matting of the clothes against the inner surface of the basket which occurs as a result of a substantial amount of water passing through them, and a speed which, if no pre-spin impulses had been provided, would have caused sticking, may be provided without the sticking occurring. Thus, the effective high speed spin of 300 r.p.m. may be provided with a full assurance that sticking will not occur.

To complete the description of the machine, at the end of the spin operation the switches 71 and 74 are opened, the opening of switch 71 effectively preventing further operation of gear motor assembly 32 and the opening of switch 74 de-energizing auxiliary timer motor 90. Shortly previous to the end of spin the switch 64 is closed by the main timer motor 63, and at the end of the spin operation the switch 65 opens. If the manually operated button 113 has been depressed to open the circuit of switch 64, its closing will have no effect, and the opening of switch 65 will cause termination of the cycle with the clothes being in a damp dry condition. However, if button 113 is not depressed, the timer motor operation will continue due to the fact that switch 64 completes the same connection between conductors 75 and 80 as switch 65 and therefore the opening of switch 65 is without effect. Also, at the end of the spin operation, switch 70 closes to cause closing of switches 82 and 83 thereby energizing heaters 39 and 40, and switch 66 closes energizing the condenser valve solenoid 52. The timer motor 63 then tolls out an appropriate drying period, at the end of which the switch 70 is opened to de-energize the heaters. A further period of tumbling is provided to provide for clothes cool-down, and then the cycle is terminated by the opening of switches 64 and 66.

It will readily be seen from the foregoing that my improved centrifugal liquid extraction process permits a very substantial amount of liquid to be extracted from the clothes without adherence of the clothes to the container in which they are provided. This is achieved by providing prior to the spin operation brief spin impulses which are provided although above the minimum sticking speed for such brief periods that sticking does not occur. It will readily be seen that this arrangement permits the use in a washer-dryer the conventional two speed type of control such as that shown. It will, of course, be understood that while suitable unbalance means may be provided for the machine shown in the figures in fact such a structure is shown in the application Ser. No. 843,755 (now Patent 3,055,203) of which this is a division, and has been eliminated both in the drawings and as to the description from this application for purposes of simplicity and because it does not pertain to the invention of this application.

While in accordance with the patent statutes I have described what at present is considered to be the preferred embodiment of my invention it will be apparent to those skilled in the art that various changes and modifications may be made therein without departing from the invention. For instance, more or fewer impulses may be provided, and a full stop, although preferred, may not be absolutely necessary.

Thus, I aim to cover in the appended claims all changes and modifications including those set forth above as fall within the true spirit and scope of my invention.

What I claim as new and desire to secure by Letters Patent of the United States is:

1. An improvement in a laundering process in which the process includes a washing period during which a clothes basket rotatably mounted on a non-vertical axis is rotated at a low speed to cause clothes contained therein to be tumbled in cleaning fluid also contained therein and a final extraction period during which the clothes basket is rotated at a higher speed for a predetermined period to extract said fluid from said clothes, said higher speed normally being in excess of a minimum speed at which, if maintained for a minimum period, clothes will adhere to the inner surface of the basket, said improvement comprising at least one preliminary extraction period between said washing period and said final extraction period for removing the major portion of the cleaning fluid from said clothes without causing the clothes to adhere to the inner surface of the basket, said preliminary extraction period including a first phase during which the speed of said basket is increased to said higher speed, a centrifuging phase during which said basket rotates at speeds greater than said minimum speed, and a decelerating phase during which the speed of said basket is decreased to speeds less than said minimum speed, the duration of said centrifuging phase being such that said basket rotates at speeds greater than said minimum speed only for a period less than said minimum period.

2. The process defined in claim 1 wherein a plurality of preliminary extraction periods are provided, each preliminary extraction period being separated from the subsequent preliminary extraction period by a reduction in speed sufficient to permit the clothes to fall away from the wall of the basket.

3. The process defined in claim 1 wherein the basket is brought to rest at the end of the decelerating phase.

References Cited by the Examiner

UNITED STATES PATENTS

| | | | |
|---|---|---|---|
| 2,311,545 | 2/43 | Hurley et al. | 68—12 |
| 2,556,490 | 6/51 | Chamberlin | 8—159 |
| 2,656,695 | 10/53 | Miller | 34—45 XR |
| 2,695,103 | 11/54 | Armstrong | 210—78 |
| 2,760,639 | 8/56 | Haverstock | 210—78 XR |
| 2,875,526 | 3/59 | Engel et al. | 68—20 XR |
| 2,972,510 | 2/61 | Buss et al. | 68—24 XR |
| 3,102,407 | 9/63 | Stilwell | 68—17 |

ROBERT F. BURNETT, *Primary Examiner.*

GEORGE D. MITCHELL, *Examiner.*